(12) United States Patent
Beach (10) Patent No.: US 6,721,145 B2
(45) Date of Patent: Apr. 13, 2004

(54) METHOD FOR INITIALIZING ANTIFERROMAGNETIC LAYERS IN A SPIN VALVE MAGNETIC SENSOR

(75) Inventor: Robert S. Beach, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 10/037,269

(22) Filed: Jan. 2, 2002

(65) Prior Publication Data

US 2003/0121565 A1 Jul. 3, 2003

(51) Int. Cl.[7] ............................................. G11B 5/127
(52) U.S. Cl. ..................... 360/324.11; 360/324.12; 360/324.1; 148/108; 29/603.08
(58) Field of Search ................... 360/324.11, 324.12, 360/324.1; 29/603.08; 148/108

(56) References Cited

U.S. PATENT DOCUMENTS

| | | | |
|---|---|---|---|
| 5,465,185 A | 11/1995 | Heim et al. | 360/113 |
| 6,282,069 B1 * | 8/2001 | Nakazawa et al. | 360/324.2 |
| 6,469,878 B1 * | 10/2002 | Mack et al. | 360/324.12 |

OTHER PUBLICATIONS

R.S. Beach et al., AP–pinned Spin Valve GMR and Magnetization, May 1, 2001, Journal of Applied Physics, vol. 87, No. 9, pp. 5723–5725.

* cited by examiner

Primary Examiner—David Hudspeth
Assistant Examiner—Natalia Figueroa
(74) Attorney, Agent, or Firm—Lewis L. Nunnelley (57) ABSTRACT

A method of initializing a magnetic sensor having two antiferromagnetic layers is described. The method takes advantage of the spin flop effect such that the two antiferromagnetic layers may be orthogonally initialized. The signal polarity of the sensor is well controlled.

16 Claims, 11 Drawing Sheets

METHOD FOR INITIALIZING ANTIFERROMAGNETIC LAYERS IN A SPIN VALVE MAGNETIC SENSOR

BACKGROUND OF THE INVENTION

1. Field of the Invention

The present invention relates generally to disk drive storage devices and more particularly to spin valve magnetic sensors used in disk drives.

2. Description of the Background Art

Disk drives provide the majority of nonvolatile storage in computer systems. A disk drive includes a disk upon which digital information is recorded and a magnetic sensor which reads back the recorded information. Spin valve sensors are commonly used as the readback sensor in most disk drives. A spin valve sensor typically has a single pinned layer or an antiparallel pinned substructure which is stabilized with an antiferromagnetic (AFM) layer. In addition there is a free layer which requires bias stabilization. The bias stabilization of the free layer can be provided with a set of hard magnets or by using a second AFM layer. Using a second AFM layer is advantageous when the sensor is to be used for narrow trackwidths. The second AFM layer can be used in an in-stack biasing arrangement or as part of a bias tab arrangement.

When using two AFM layers in a spin valve sensor it is necessary to initialize both layers and the directions of initializations are typically orthogonal to each other. The process of initialization is described in detail below.

One method of initializing the two AFM layers is to use different AFM materials which have different blocking temperatures. Two initialization steps at different temperatures are carried out. This method does not allow the use of the same AFM material to be used in both of the AFM layers.

Another method is to use the spin flop effect (described in detail below) to simultaneously initialize the two AFM layers by placing the sensor in a magnetic field chosen to give orthogonal initialization. The sensor must have at least one antiparallel (AP) pinned substructure in order to use the spin flop effect. The sensor is then heated above the blocking temperatures of the AFM materials in the presence of that field. One problem with this method is that the spin flop can result in a 90 degree orientation as often as a −90 degree orientation. Therefore the signal polarity of the sensor is not predictable. In most servo systems within disk drives it is important that the polarity of the readback signal is well defined. Accordingly the lack of control of signal polarity is undesirable. Another aspect of the previous method of initializing the spin flop sensor is that when using an AFM material with a high blocking temperature (e.g. PtMn and NiMn), heating the sensor above the blocking temperature can cause thermal damage.

Thus there is a need for using the spin flop effect to initialize a spin valve sensor having two AFM layers which allows for control of signal polarity, allows for use on the finished sensor, and does not place the sensor at risk to thermal damage.

SUMMARY OF THE INVENTION

In one embodiment of the present invention, the AFM layer adjacent to the AP pinned substructure in a spin valve sensor is pre-initialized. The spin flop effect is then utilized in an initialization. Another aspect of the present invention is that both the pre-initialization and the initialization may be accomplished by performing a thermal treatment of the sensor at a lower temperature than the blocking temperature of the AFM layers. A method embodying the present invention results in a sensor having two AFM layers wherein the AFM layers can be formed from substantially the same material; the polarity of the sensor is well controlled; and, there is much less risk of thermal damage to the sensor.

In order to use the spin flop effect in initializing a spin valve sensor, there must be an antiparallel substructure within the sensor. In one embodiment of the present invention, the AFM layer adjacent to one of the ferromagnetic layers in the antiparallel substructure is pre-initialized by performing a thermal treatment in the presence of a relatively high magnetic field. The temperature may be lower than the blocking temperature of the AFM material. An alternative is to pre-initialize utilizing a magnetic field with low magnitude. After the pre-initialization, the magnetic field is rotated and the magnitude of the field is chosen to maintain the pre-initialization state of the first AFM layer. Then a second thermal treatment is performed in the presence of the second magnetic field to initialize the second AFM layer. Because the second magnetic field is chosen to take advantage of the spin flop effect, the pre-initialized state of the first AFM layer does not substantially change.

In another embodiment of the invention the randomness in the initial directions of magnetization is greatly reduced by providing for a preferred direction of the magnetization by creating a uniaxial anisotropy in the constructed films. The sensor is then pre-initialized by being placed in a low magnetic field. The magnitude of the field is then increased to the optimal value to utilize the spin flop effect during an initialization.

Magnetic sensors manufactured according to an embodiment of the present invention thus have well defined signal polarity and have much less risk of thermal damage. Other aspects and advantages of the present invention will become apparent from the following detailed description which when taken in conjunction with the accompanying drawings, illustrate by way of example the principles of the invention.

DETAILED DESCRIPTION OF THE INVENTION

Spin valve sensors, also referred to as giant magnetoresistive (GMR) sensors, are widely used in magnetic disk drive storage devices. Spin valve sensors and tunnel valve sensors both utilize spin dependent electron transport through the sensor to modulate the resistance in response to an external magnetic field. These sensors have two adjacent ferromagnetic films. The magnetization in one film, the pinned layer, is fixed in a specific direction. The magnetization in the other film, the free layer, is free to change directions in response to the direction of an external magnetic field. In a disk drive the external magnetic field comes from a written transition on the disk. Both the magnetizations in the free layer and the pinned layer must be stabilized with respect to spurious movements. In the present invention two separate antiferromagnetic layers (AFM) are used in the sensor. One of the AFM layers is used to pin the direction of magnetization in the pinned ferromagnetic layer. The other AFM layer is used for magnetic bias stabilization in the free layer. The present invention is operable for sensors which have an antiparallel (AP) pinned substructure. The structure and the method is described in detail below.

In a preferred embodiment, the AFM layer adjacent to the AP pinned substructure in a spin valve sensor having two AFM layers is pre-initialized. The sensor is then initialized utilizing the spin flop effect. In another aspect of the present invention, lower temperatures are used during pre-initialization and initialization compared with the blocking temperatures of most practical AFM materials. This invention enables the use of the same AFM material in both of the AFM layers. Alternatively, the sensor can have two different AFM materials having different blocking temperatures. The sensor has well defined signal polarity and has less risk of thermal damage during initialization.

Figure 1:
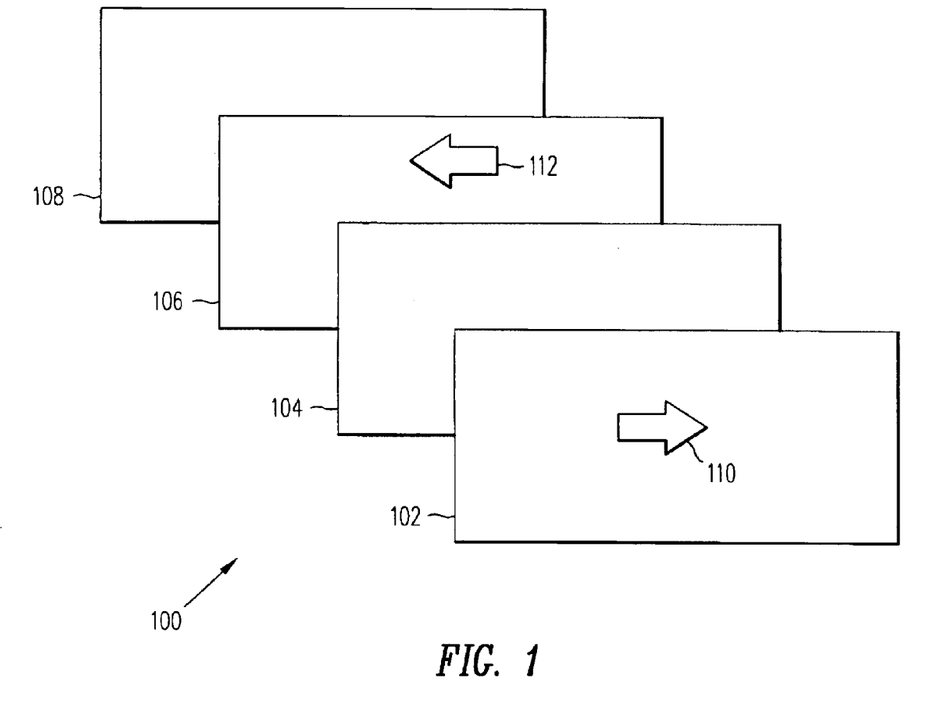
FIG. 1 shows a view of an AP pinned substructure.

The sensor must have at least one antiparallel (AP) pinned substructure in order to use the spin flop effect in the initialization. A typical AP pinned substructure is illustrated in FIG. 1. In FIG. 1 a sandwich of layers of thin films is shown. There are two ferromagnetic films 102 and 106 which are separated by a nonmagnetic layer 104. The ferromagnetic films are typically formed from Fe, Co, or Ni or a combination of these elements. The nonmagnetic layer 104 is typically formed from ruthenium or another material which promotes antiparallel magnetic coupling between the two ferromagnetic films 102 and 106. The direction 110 of magnetization in film 102 is substantially opposite from the direction 112 of magnetization in the other ferromagnetic film 106 in the absence of an external magnetic field. The directions 110, 112 of the two magnetizations are said to be antiparallel. The AP pinned substructure is defined as the two ferromagnetic films 102, 106 along with the nonmagnetic film 104. Another layer present is an antiferromagnetic (AFM) layer 108 formed adjacent to one of the ferromagnetic films of the AP pinned substructure. In FIG. 1 the AFM layer 108 is adjacent to the first ferromagnetic film 106. The first ferromagnetic film 106 in an AP pinned substructure is defined here as the film 106 adjacent to the AFM layer 108. The first ferromagnetic film in an AP pinned substructure is also called AP1 and the other ferromagnetic film is also called AP2. When the ferromagnetic film 106 is placed in an external magnetic field, the magnetization in the ferromagnetic film will assume a direction in response to the external field. If the AFM layer 108 is initialized by heating and subsequent cooling while the sensor is in the external field, the direction 112 of magnetization in the first ferromagnetic film 106 is maintained or pinned by exchange coupling with the AFM layer 108. Once the direction of the magnetization 112 in the first ferromagnetic film 106 adjacent to the AFM layer 108 is pinned, the magnetization in the second ferromagnetic film 102 is in the opposite direction 110 (in the absence of an external field) because of the AP magnetic coupling between the two ferromagnetic films 102, 106.

The directions of the magnetizations in the ferromagnetic films of an AP pinned substructure will generally be altered in the presence of an external magnetic field. The movement of the direction of magnetization in the ferromagnetic films in an AP pinned substructure is referred to as the spin flop effect.

Figure 2A:
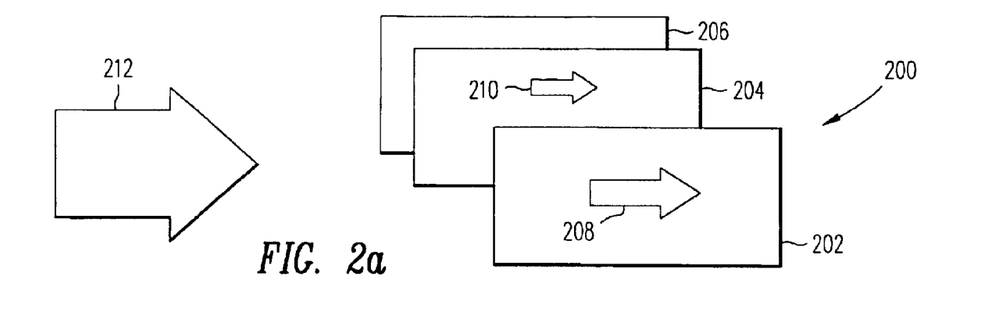
FIG. 2a illustrates the directions of magnetization in an AP pinned substructure in the presence of a high external magnetic field.

FIGS. 2a, b, c, and d illustrate the spin flop effect by showing the behavior of the directions of the magnetization in the presence of external magnetic fields of differing magnitudes. The AP pinned substructure 200 has two ferromagnetic films 202, 204. An AFM layer 206 is adjacent to the first ferromagnetic film 204. In addition there is a nonmagnetic layer (not shown) disposed between the two ferromagnetic films 202, 204. Typically the magnitude of the magnetization of the first ferromagnetic film 204 adjacent to the AFM layer 206 is slightly less than the magnetization of the second ferromagnetic film 202. Accordingly in FIGS. 2a, 2b, 2c, and 2d the size of the arrow 210 representing the magnetization of the first film 204 adjacent to the AFM layer 206 is smaller than the arrow 208 representing the magnetization in the second ferromagnetic film 202.

In FIG. 2a an AP pinned substructure 200 is placed in a high external magnetic field 212. In the presence of a high external magnetic field 212 in the plane of the films, the direction 210 of magnetization in the first ferromagnetic film 204 and the direction 208 of the magnetization in the second ferromagnetic film 202 point substantially along the direction of the external field 212. Since the magnetization directions 210, 208 are no longer antiparallel, the magnetic coupling is said to be broken.

Figure 2B:
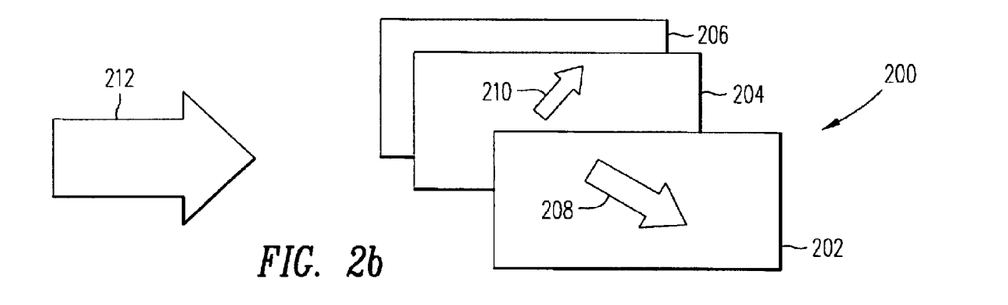
FIG. 2b illustrates the directions of magnetization in an AP pinned substructure in the presence of a moderately high external magnetic field.

FIG. 2b shows the case where the magnitude of the external field 212 is reduced somewhat. In this case the energetically favored behavior is that the direction 210 of magnetization in the first ferromagnetic film 204 and the direction 208 of magnetization in the second ferromagnetic film 202 both rotate away from the direction 212 of the external field. Also the directions 208, 210 of magnetization rotate away from each other.

Figure 2C:
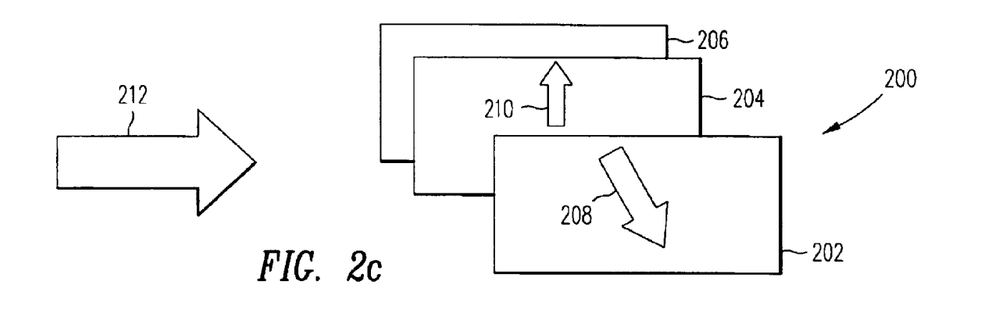
FIG. 2c illustrates the directions of magnetization in an AP pinned substructure in the presence of an optimal external magnetic field.

As the external applied field 212 is reduced further there will be an optimal value of the applied field such that the direction 210 of magnetization of the first ferromagnetic film 204 adjacent to the AFM layer 206 will be 90 degrees relative to the external field 212. This is illustrated in FIG. 2c. At the optimal value of the external field, the direction 208 of magnetization of the second ferromagnetic film 202 is typically not exactly opposite from the direction 210 of magnetization in the first film 204.

Figure 2D:
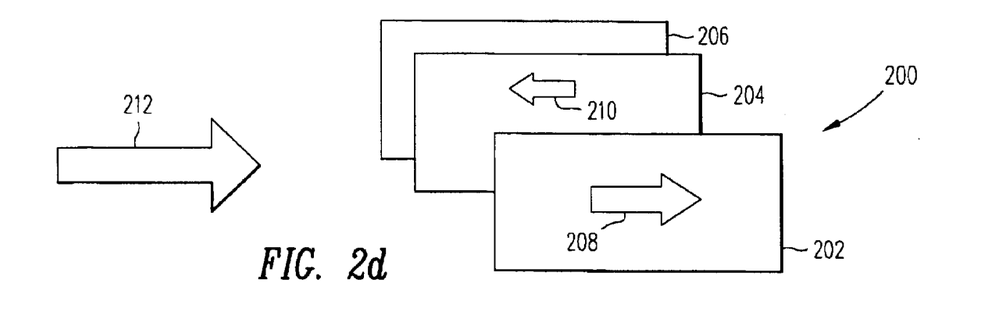
FIG. 2d illustrates the directions of magnetization in an AP pinned substructure in the presence of a low external magnetic field.

FIG. 2d shows that for a low value of external applied field 212 the direction 208 of magnetization of the second ferromagnetic film 202 tends to align with the external field 212 and the direction 210 of magnetization of the first ferromagnetic film 204 tends to be substantially opposite to the direction 208 of magnetization in the second film 202.

Typically the magnitude of the high applied external field which can break the coupling in an AP pinned substructure and cause the direction of the magnetizations in the ferromagnetic films to point in substantially the same direction is about 4000 Oe or higher. This value will depend on the specific magnetizations of the ferromagnetic films and the nonmagnetic layer properties and can be lower in some cases.

The magnitude of the applied field required to utilize the spin flop effect, herein called the optimal value, also depends to some extent on the combination of materials and film thicknesses. For a given set of film thicknesses and compositions the optimal field magnitude can be calculated from the following equation:

$$H_{opt} = \sigma_{Ru}\{1/\mu_2^2\}$$

where, $H_{opt}$ is the optimal field magnitude to cause the magnetization in AP1 to be 90 degrees relative to the applied field; $\sigma_{Ru}$ is the coupling strength of ruthenium (erg/cm$^2$); $\mu_1$ is the magnetic moment-thickness product, $M_r t$ (emu/cm$^2$), of AP1; and, $\mu_2$ is the magnetic moment-thickness product, $M_r t$, of AP2. The equation above was developed with the assumption that there was no anisotropy in the sensor. As a practical matter there are usually uncertainties in the values of the quantities in the equation, however the optimal field magnitude can also be determined experimentally. An effective value when using common ferromagnetic films is between 2000 and 3000 Oe but can range from about 1000 Oe to above 4000 Oe.

The magnitude of the low field is such that the AP coupling is not broken. Low field magnitudes are generally less than a few hundred Oersteds and typically less than 500 Oe.

The direction of magnetization in a ferromagnetic film which is adjacent to an AFM layer may be maintained in a desired direction by initializing the AFM layer. Initializing the AFM layer is also referred to as pinning. The method is to place the assembly of layers in an applied magnetic field in order to orient the magnetization of the adjacent ferromagnetic film in the desired direction. Then the AFM layer is given a thermal treatment. The thermal treatment may be relatively rapid by heating above the blocking temperature and subsequently cooling in the presence of the applied field. The blocking temperature of an AFM layer is the temperature above which the material has no significant exchange coupling with an adjacent ferromagnetic film.

Alternatively, a slower thermal treatment of the AFM layer can be accomplished by heating to a temperature lower than the blocking temperature for a longer period of time and subsequently cooling while in the presence of the applied field. Although there is some uncertainty about the exact mechanism, evidently both the slow and rapid thermal treatments cause the internal magnetic grains in an AFM layer to reorient. Performing a slow thermal treatment on the sensor has the advantage that the sensor is at less risk of thermal damage from interdiffusion and other effects which can be exhibited at higher temperatures. As the AFM material cools from either the rapid or slow thermal treatment method, magnetic exchange coupling with the ferromagnetic film will preserve the direction of magnetization in the ferromagnetic film. For some AFM materials such as PtMn a slow thermal treatment is preferred to cause structural ordering. The structural ordering occurs simultaneously with the magnetic reordering enabling pinning. As deposited, the crystallographic structure of PtMn is usually fcc which does not have a well defined blocking temperature. A slow thermal treatment of a PtMn layer produces the fct structure which is preferred for use as an AFM material. A slow thermal treatment for the purpose of causing structure changes is also called an anneal.

Typical conditions for performing a slow thermal treatment can vary considerably depending on the materials present. For example if the AFM material is PtMn which has a blocking temperature of approximately 350° C., an effective slow thermal treatment can be performed by placing the sensor in a temperature of 280° C. for 4 hours. An even slower treatment of 220° C. at 8 hours, for example, would be effective for reorienting the grains in materials which do not require structural changes. Typically an effective slow treatment can be performed in a temperature range of 1 to 20 hours in a temperature range of 150° C. to 400° C.

Figure 3A:
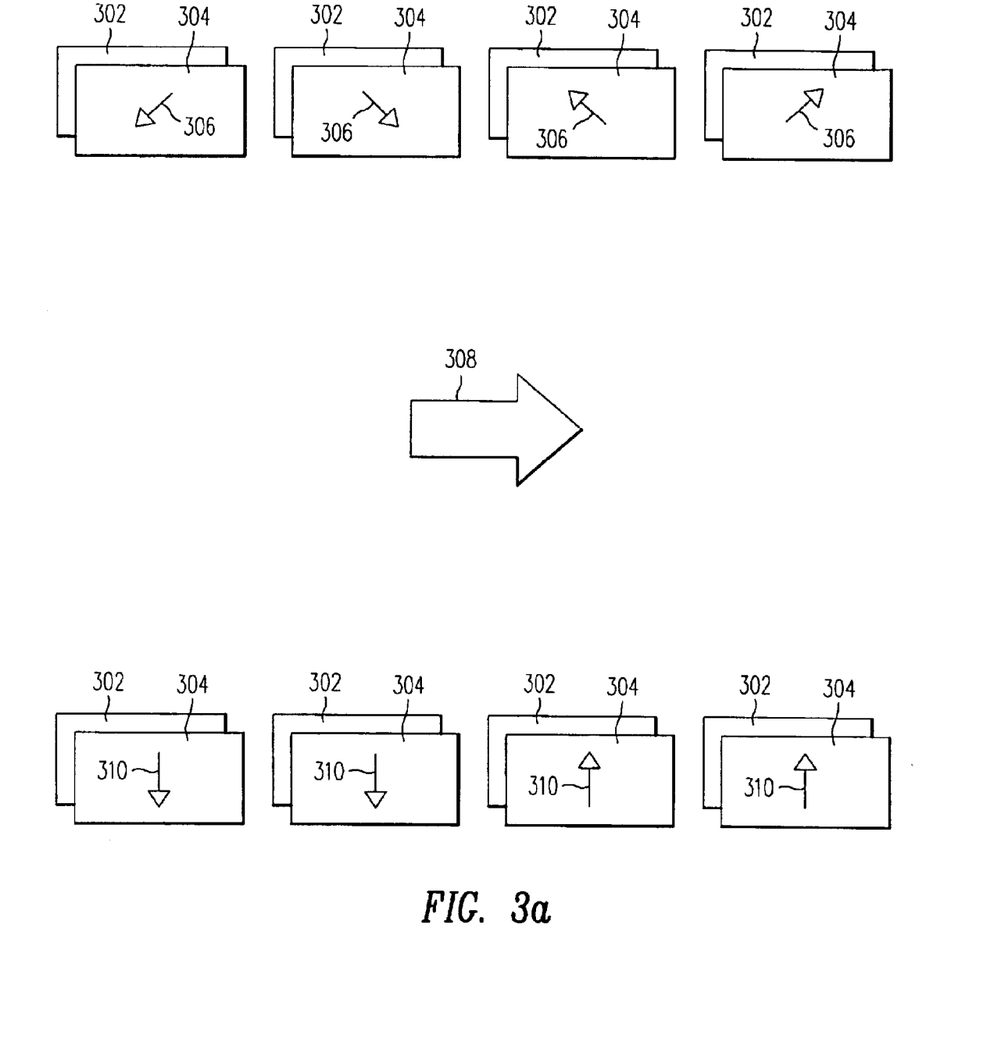
FIG. 3a illustrates the random bipolar orientation of initialized states resulting from the prior art methods.
Figure 3B:
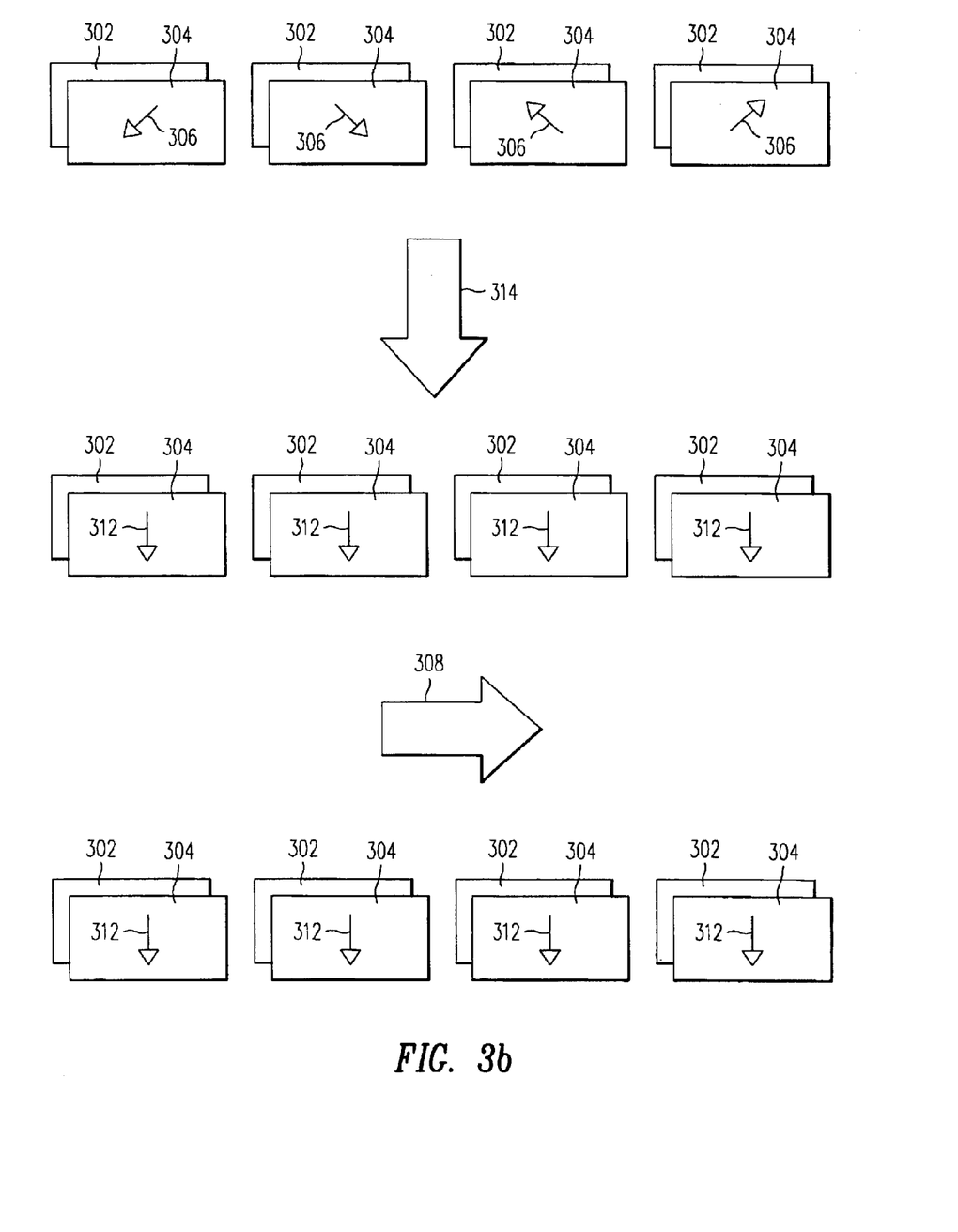
FIG. 3b illustrates the use of pre-initialization to remove the randomness of initial magnetization directions.

FIG. 3a shows a representation of the behavior of sensors if a pre-initialization is not performed. One AFM layer 302 and one ferromagnetic film 304 which is part of an AP pinned substructure and which is adjacent to the AFM layer 302 is shown. The second ferromagnetic film in the AP pinned substructure is not shown. When the sensor is first constructed, the orientations 306 of the magnetization in the ferromagnetic films 304 are usually random within the plane of the films 304. This randomness can be observed from sensor to sensor within one wafer, or, on average, from wafer to wafer. If an initialization is then performed on this group of sensors in a magnetic field having orientation 308 as shown and a magnitude to utilize the spin flop effect, then the orientations of the magnetizations in the ferromagnetic films after initialization will be as shown 310. The spin flop effect will operate such as to rotate the magnetization through the smallest angle to achieve 90 degrees relative to the orientation field. The magnetization will also be constrained to the plane of the ferromagnetic film. Thus the orientation of the magnetization will have a bipolar distribution of either 90 degrees or −90 degrees relative to the orientation field. FIG. 3b shows a brief schematic of one implementation of the present invention. The group of sensors having random magnetizations 306 in the ferromagnetic films 304 is first pre-initialized with a high magnetic field 314 as indicated. After the pre-initialization the directional randomness of the magnetizations has been substantially reduced as shown 312. The second AFM layer in the group of sensors (not shown in FIG. 3b) can then be initialized using an optimal field value 308 for the spin flop effect. Even though the first AFM layer also undergoes the thermal treatment during initialization, the important point is that the direction 312 of the magnetizations in the first ferromagnetic layers 304 is not substantially changed by the initialization. The beneficial effects of the pre-initialization to substantially reduce the randomness in the magnetization directions are not altered by the initialization.

Figure 3C:
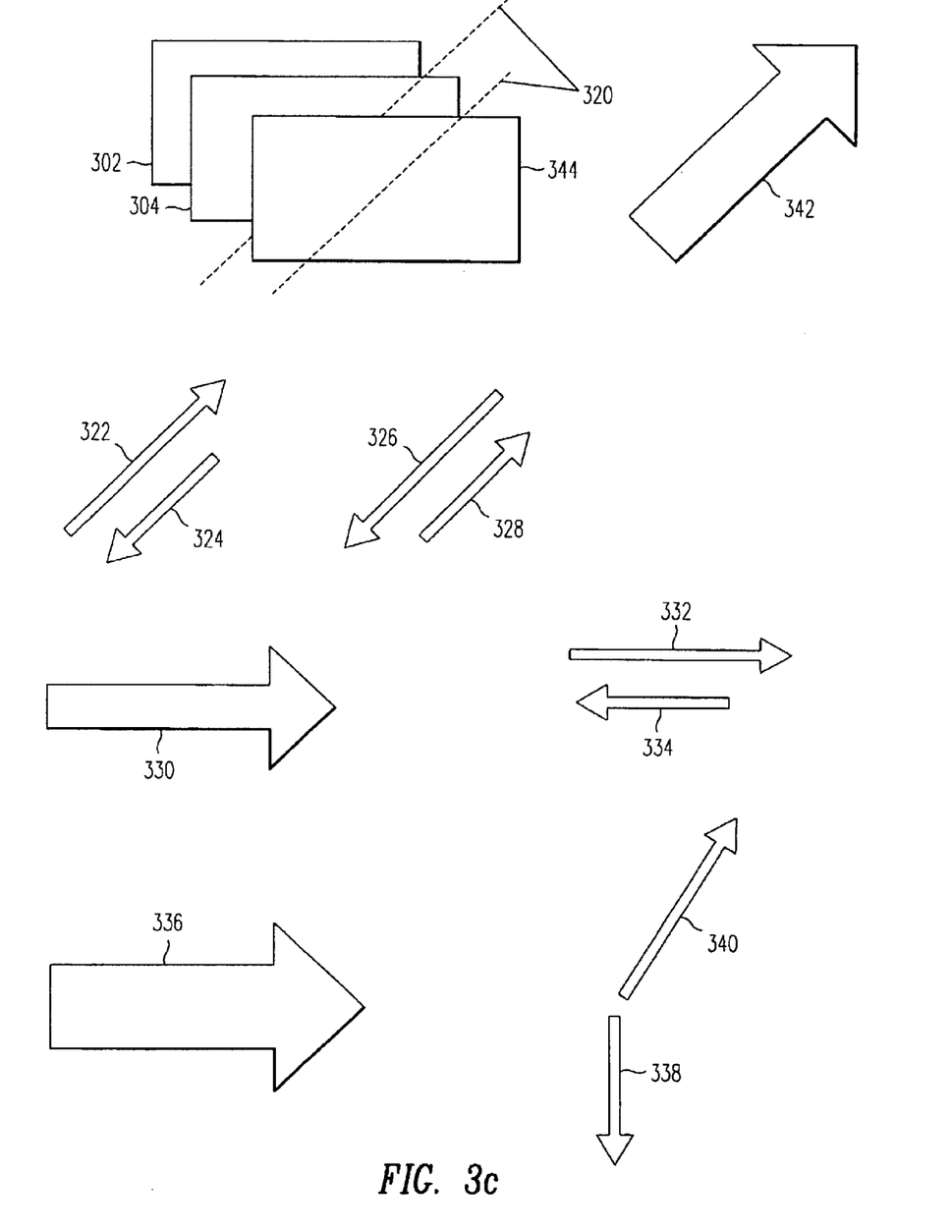
FIG. 3c illustrates the use of constructing a preferred direction during film deposition to remove the randomness of initial magnetization directions.

An alternative method of removing the random orientation of magnetization in the first ferromagnetic film is illustrated in FIG. 3c. During the deposition of the first ferromagnetic film 304 a uniaxial anisotropy is induced in the film 304. The anisotropy axis 320 may also be formed in the second ferromagnetic film 344, or preferably in both the first 304 and second 344 ferromagnetic films. This is usually accomplished by depositing the film 304 in the presence of a magnetic field 342. The orientation of the field 342 during the deposition of the film 304 is the same as the desired direction of the anisotropy axis 320. The direction of the anisotropy axis 320 is shown at approximately 45 degrees relative to the direction of the field 336 which will be used for initialization. After the deposition of the layers of the sensor, the directions 324, 328 of the magnetization in the first ferromagnetic film 304 tend to align along the direction (either 0 degrees or 180 degrees) of the anisotropy axis 320. The direction of the magnetization 322, 326 in the second ferromagnetic film 344 will be antiparallel with respect to the direction of magnetization 324, 328 in the first magnetic film 304 in the absence of an external magnetic field.

Referring to FIG. 3c, if the sensor having an anisotropy axis 320 in either AP1 304 or AP2 344 or both AP1 304 and AP2 344 is now placed in a weak magnetic field with orientation as indicated by reference numeral 330, the magnetization 334 in the first ferromagnetic film 304 and the magnetization 332 in the second ferromagnetic film 344 will be as shown provided that the moment of AP2 344 is greater than the moment of AP1 304. This effect was previously described with regard to FIG. 2d. If the magnetic field 336 is now increased in magnitude to the optimal value for the spin flop effect to occur, then the magnetization 340 of the second film 344 will rotate toward the anisotropy axis 320. The magnetization 338 in the first ferromagnetic film 304 will rotate away from the magnetization 340 of the second ferromagnetic film 344. At this point the initial randomness in the directions 324, 328 of magnetization in the first ferromagnetic film 304 has been removed and the final direction 338 of magnetization in the first ferromagnetic film 304 is in the desired perpendicular direction 338 relative to the applied field 336. Effectively a pre-initialization has been performed. An initialization is then performed using a thermal treatment. One advantage of this alternative method is that a separate thermal treatment is not required for the pre-initialization.

Figure 4A:
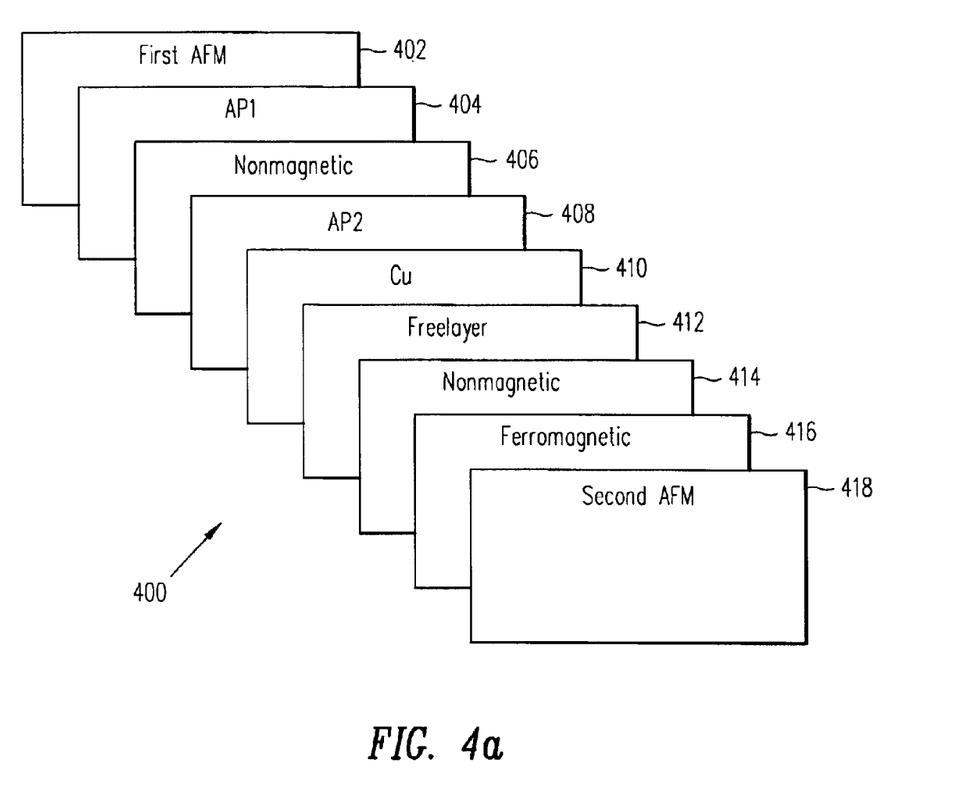
FIG. 4a shows a typical sensor with in-stack biasing.

Briefly there are at least three methods of using a pre-initialization along with the spin flop effect to substantially reduce the initial randomness in the initial directions of magnetizations in a sensor. All of the embodiments relate to a sensor which has at least one AP pinned substructure and two AFM layers. FIG. 4a shows sensor 400, one of several possible sensors which meet these criterion. The sensor 400 shown in FIG. 4a is constructed of a stack of layers beginning with the first AFM layer 402. The first AFM layer 402 is adjacent to the first ferromagnetic film 404 in the AP pinned substructure. The second ferromagnetic film 408 in the AP pinned substructure is separated from the first ferromagnetic film 404 by a nonmagnetic layer 406, usually constructed of ruthenium. A nonmagnetic layer 410, usually of copper, separates the freelayer 412 from the AP pinned substructure. The free layer 412 is also formed from a ferromagnetic material. The remaining ferromagnetic film 416 is separated from the freelayer 412 by another nonmagnetic layer 414. The nonmagnetic layer 414 is conveniently formed from a material such as tantalum to promote weak magnetic coupling between the third ferromagnetic film 416 and the free layer 412 and also to diminish any GMR activity between the free layer 412 and the third ferromagnetic film 416. Finally the second AFM layer 418 is adjacent to the ferromagnetic film 416. The magnetization in the third ferromagnetic film 416 provides bias stabilization to the free layer 412 and is therefore sometimes called the bias stabilization layer. The second AFM layer 418 is used for pinning the direction of the magnetization in the ferromagnetic bias stabilization layer 416. In addition to the layers shown in FIG. 4a there may be additional layers inserted for other reasons such as enhancing sensitivity.

Figure 4B:
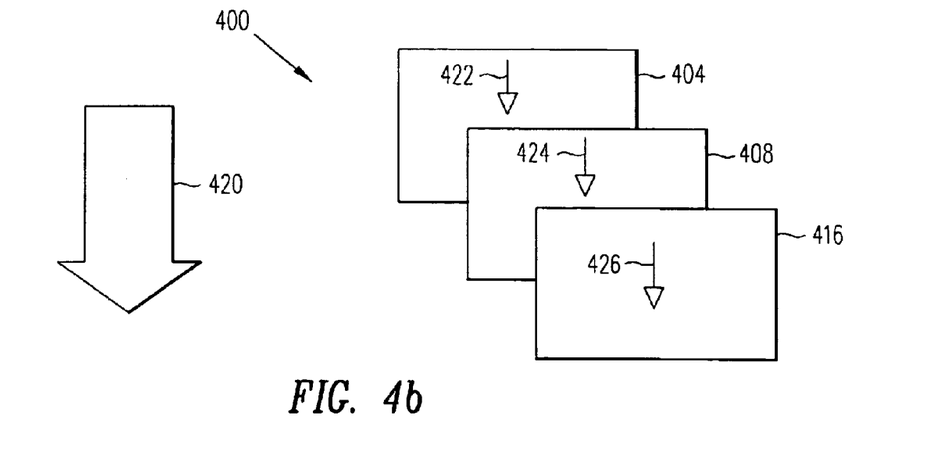
FIG. 4b shows the directions of magnetization when the sensor is in a strong field.
Figure 4C:
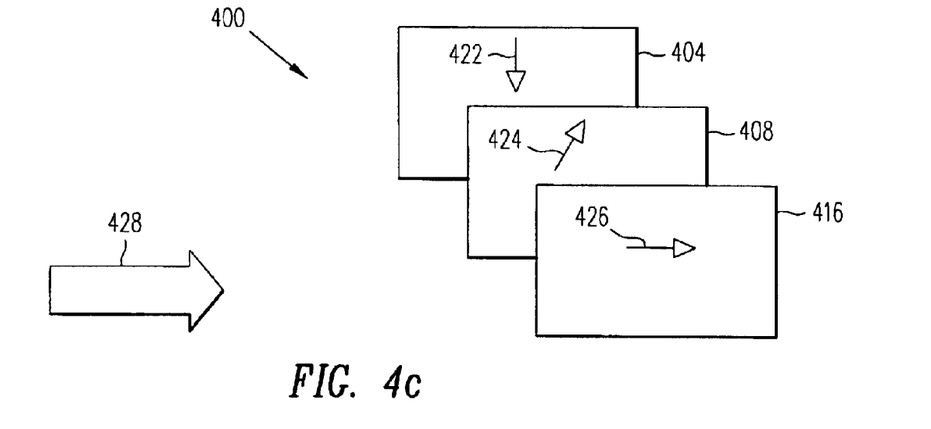
FIG. 4c shows the directions of magnetization when the sensor is in the optimal field after pre-initialization with a strong field.

Method I is illustrated in FIGS. 4b, c, and d where only the ferromagnetic films AP1 404, AP2 408 and the third ferromagnetic film 416 from FIG. 4a are shown. The first step in Method I is to perform a pre-initialization in a strong magnetic field with a direction 420 as shown. Because the external field 420 is strong, the directions 422, 424, and 426 of the magnetization in all three ferromagnetic films 404, 408, and 416 align with the external field 420. After the sensor 400 has been placed in the external magnetic field 420, a thermal treatment is performed. The magnetization 422 in the first ferromagnetic film 404 is now pinned in the desired direction and the initial randomness in the direction of magnetization is substantially reduced. Referring to FIG. 4c, the sensor is then placed in a magnetic field with an orientation given by reference number 428. The magnitude of this field is the optimal value to utilize the spin flop effect. Because of the spin flop effect the magnetization 422 in the first ferromagnetic film 404 remains in the same direction 422 as previously pinned in the presence of the high magnetic field. Again referring to FIG. 4c, the magnetization 426 in the third ferromagnetic film 416 aligns with the applied magnetic field 428. This ferromagnetic film 416 is not part of the AP pinned substructure. Note that the magnetization 424 in the second ferromagnetic film 408 is not necessarily 180 degrees with respect to the magnetization 422 in the first magnetic film 404. An initialization is accomplished by performing a second thermal treatment in the presence of the applied magnetic field 428.

Figure 4D:
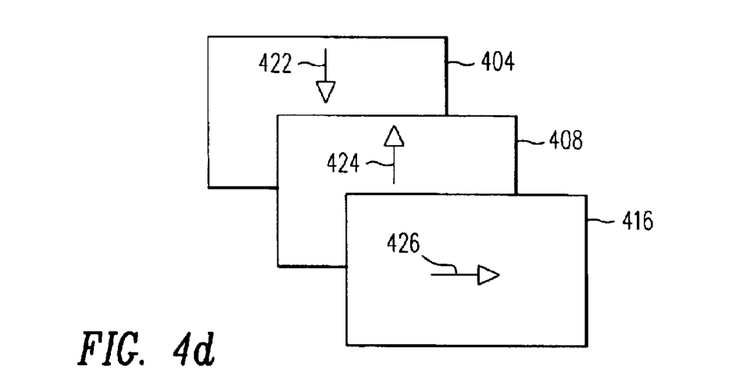
FIG. 4d shows the directions of magnetization after Method I is used to pre-initialize and initialize the sensor.

As illustrated in FIG. 4d, after the two thermal treatments and after the removal of the applied magnetic fields, the magnetization 422 is oriented in the desired direction without undesired randomness. In the absence of an applied magnetic field the magnetization 426 in the third ferromagnetic film 416 is perpendicular to the magnetization 422 in the first ferromagnetic film 404. Also, the magnetization 424 in the second ferromagnetic film 408 is approximately 180 degrees with respect to the magnetization 422 in the first ferromagnetic film 404.

Figure 4E:
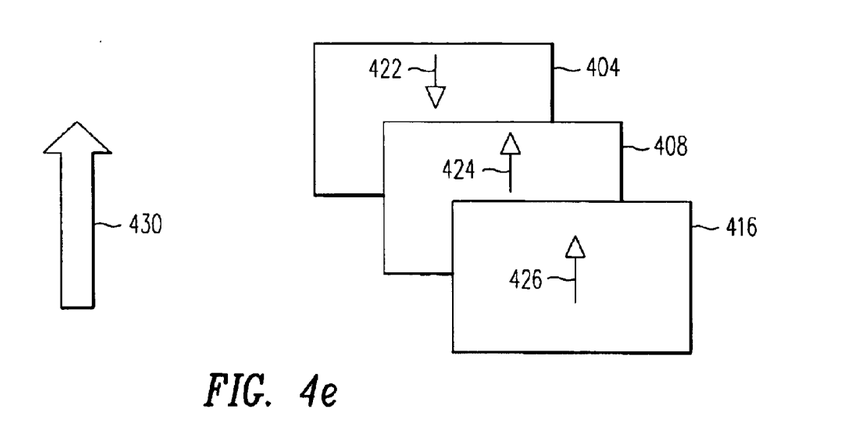
FIG. 4e shows the directions of magnetization when the sensor is placed in a weak field.
Figure 4F:
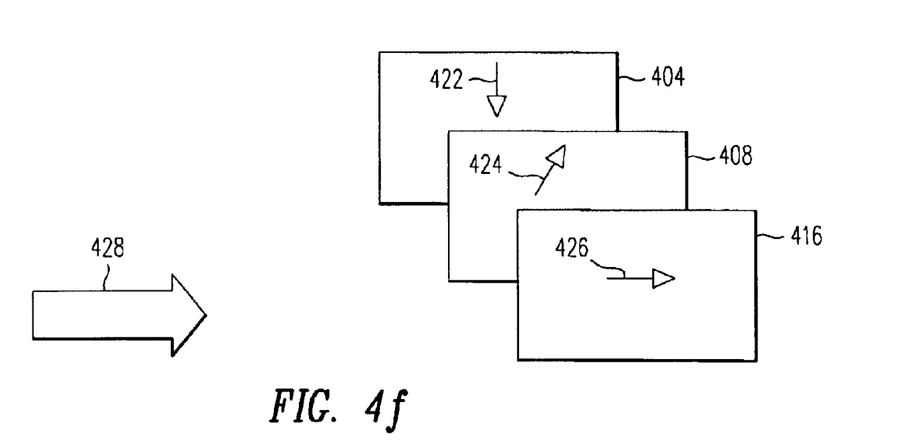
FIG. 4f shows the directions of magnetization when the sensor is placed in the optimal field after pre-initialization with a weak field.
Figure 4G:
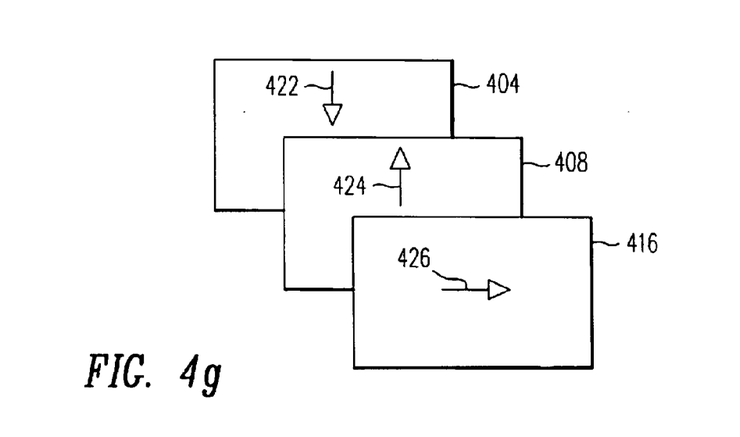
FIG. 4g shows the directions of magnetization after the sensor has been pre-initialized and initialized with Method II.

Method II is illustrated in FIGS. 4e, f, and g. Referring to FIG. 4e, the pre-initialization is accomplished with a weak field with a direction as indicated by reference number 430. In the presence of a weak field the magnetization 424 in the second ferromagnetic film 408 will align with the field 430. Typically the magnitude of the magnetization 424 of the second ferromagnetic film 408 is somewhat greater than the magnitude 422 of the first ferromagnetic film 404. In a weak field the AP coupling is not broken and the magnetization 422 in the first ferromagnetic film 404 is essentially 180 degrees with respect to the magnetization 424 in the second ferromagnetic film 408. A pre-initialization is then accomplished by performing a thermal treatment.

After the pre-initialization, a second applied field 428 with an optimal magnitude to utilize the spin flop effect is used as illustrated in FIG. 4f. From this point Method II is similar to Method I. The magnetization 422 in the first ferromagnetic film 404 is aligned essentially perpendicular to the applied field 428. The magnetization 426 in the third ferromagnetic film 416 aligns with the applied field 428. An initialization is performed with a second thermal treatment. The results after initialization and removal of the applied field is illustrated in FIG. 4g. The magnetization 422 is oriented in the desired direction and the magnetization 426 in the third ferromagnetic film 416 is pinned perpendicular to the magnetization 422 in the first ferromagnetic film 404.

Figure 4H:
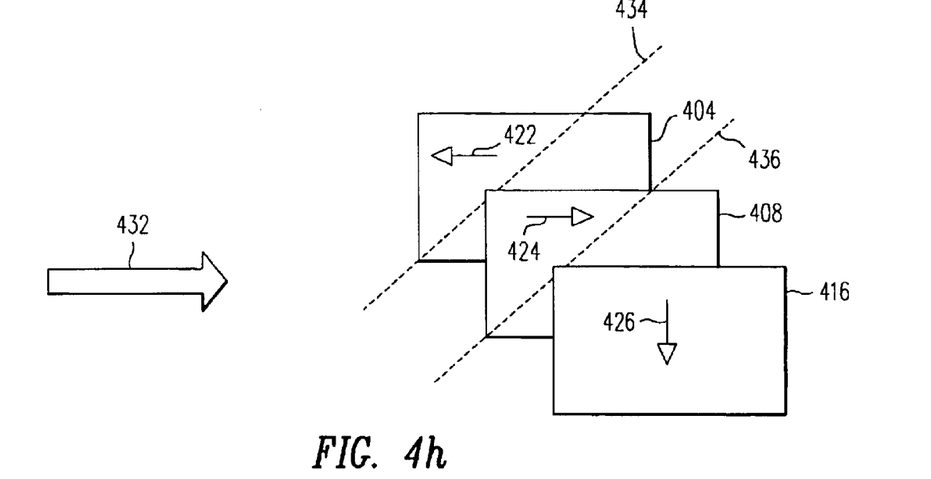
FIG. 4h shows the directions of magnetization when the sensor having an anisotropy axis is placed in a weak field.
Figure 4I:
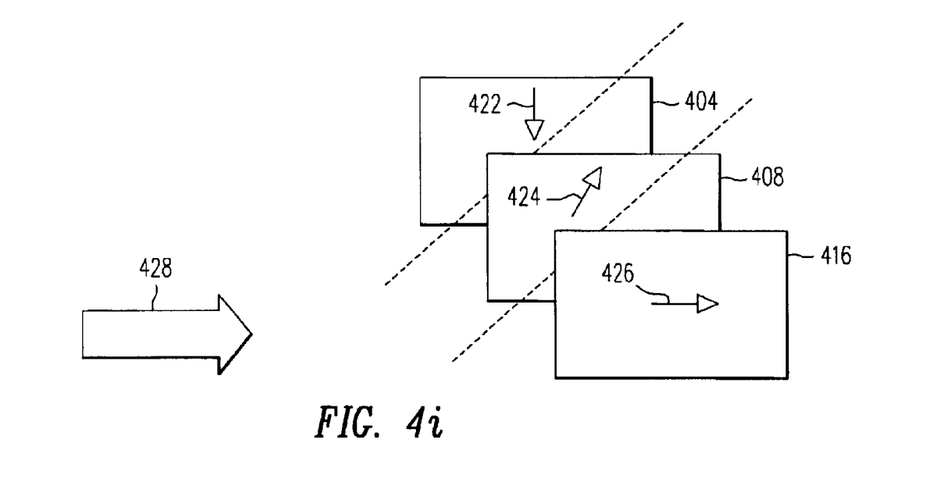
FIG. 4i shows the directions of magnetization in a pre-initialized sensor wherein the sensor includes an anisotropy axis and is placed in a field with the optimal magnitude.
Figure 4J:
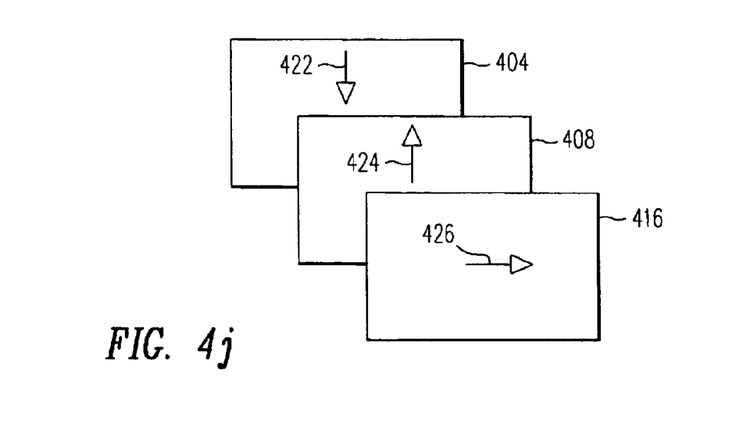
FIG. 4j shows the directions of magnetization after the sensor has been pre-initialized and initialized with Method III.

Method III is illustrated in FIGS. 4*h*, *i*, and *j*. A uniaxial anisotropy is induced during the construction of the films as previously discussed. The anisotropy axis 434, 436 may be constructed in the first ferromagnetic film 404, the second ferromagnetic film 408, or preferably in both films 404, 408. In the presence of a weak external magnetic field with orientation as shown by reference number 432 the magnetization 424 of the second ferromagnetic film 408 will tend to align along the direction of the applied field 432 but will lean toward the anisotropy axis 434, 436 as shown. This breaks the initial symmetry and reduces the randomness of the magnetization in the sensor films. Other methods of generating an anisotropy in the sensor is to use shape anisotropy or to perform a magnetic anneal after the sensor is constructed. The initial random direction of magnetization in the second film 408 has now been removed. Also in the presence of a weak field the magnetization 422 in the first ferromagnetic film 404 will be essentially 180 degrees with respect to the magnetization 424 in the second ferromagnetic film 408. The pre-initialization for Method III requires placing the sensor in a weak field but does not require a separate thermal treatment.

Referring now to FIG. 4*i*, the applied magnetic field is maintained in the same direction 428 but the magnitude is increased to the optimal value of the field to utilize the spin flop effect. The magnetization 422 is now substantially perpendicular to the applied field 428 and the magnetization 426 in the third ferromagnetic film 416 is aligned with the applied magnetic field 428. A single thermal treatment is now performed which pins both the first 404 and third 416 ferromagnetic films. The resulting sensor shown in FIG. 4*j* has the magnetizations 422, 424, 426 in the ferromagnetic films 404, 408, 416 aligned in the desired directions.

The present invention provides a method of initializing a sensor which has at least one AP pinned substructure and two separate AFM layers. There are several sensor structures which have both an AP pinned substructure and two AFM layers. One such example using in-stack biasing was shown in FIG. 4*a*.

Figure 5:
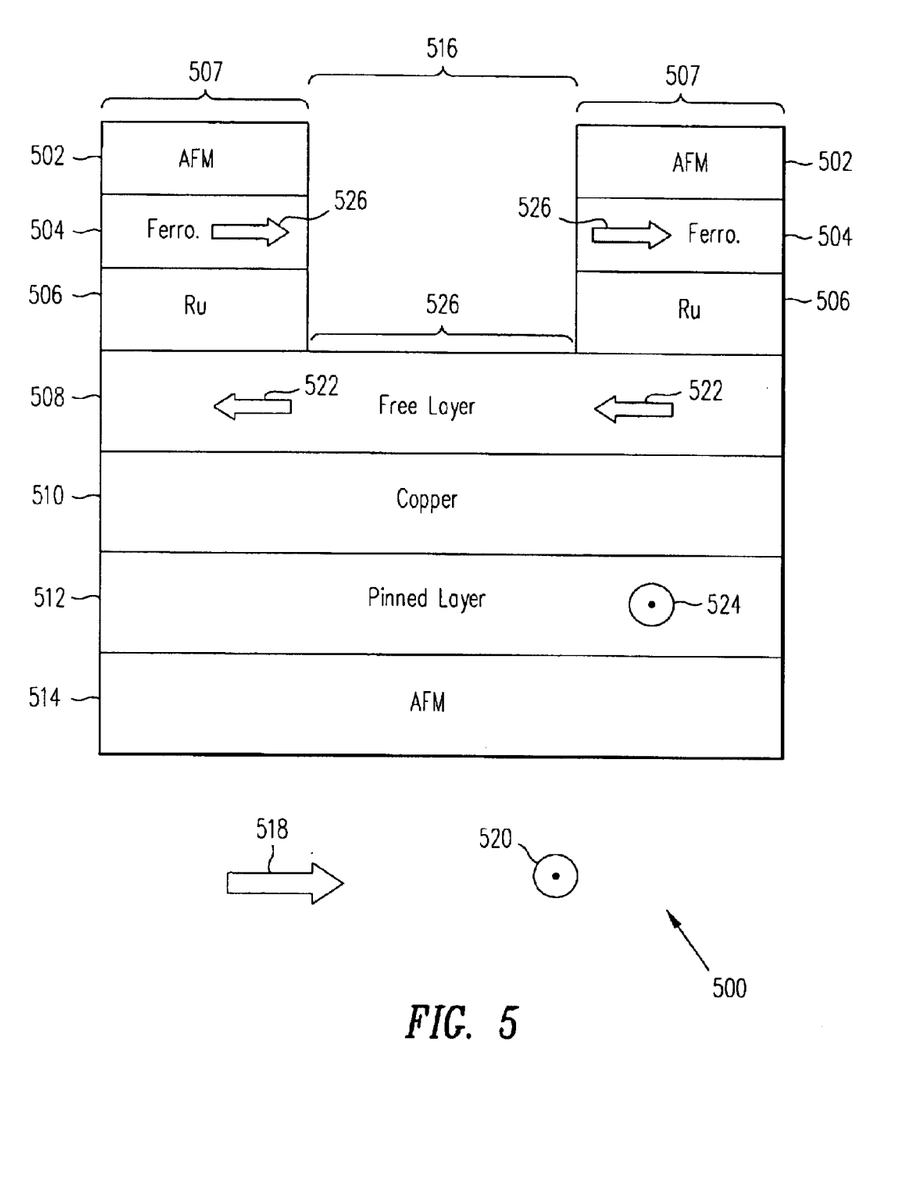
FIG. 5 shows a diagram of a sensor with bias tabs.

Another example of a sensor 500 which has two AFM layers and an AP pinned substructure is shown in FIG. 5. One or more portions 507 of the free layer 508 are AP coupled with a first ferromagnetic layer 504. A nonmagnetic spacer layer 506 typically formed from ruthenium is placed between the ferromagnetic layer 504 and a portion 507 of the free layer 508. The ferromagnetic layer 504 is adjacent to an AFM layer 502. A gap 516 is formed in the layers 502, 504, and 506 in order to form an active portion 526 of the free layer 508. The free layer 508 is separated from the pinned layer 512 by a nonmagnetic layer 510 typically formed from copper. A second AFM layer 514 is placed adjacent to the pinned layer 512.

When Method I is used on the sensor 500 in FIG. 5, the pre-initialization is performed with a thermal treatment in an external high magnetic field having a direction as shown by reference number 518. This pre-initialization substantially removes the randomness in the direction of magnetization in the first ferromagnetic film 504 and leaves the magnetization in a direction 526 as shown in FIG. 5. During the pre-initialization the magnetization in the portions 507 of the free layer 508 adjacent to the ruthenium layer 506 assumes the same direction as the applied field 518. However after removal of the applied field the magnetization of those portions 507 of the free layer 508 will be in a direction indicated by reference number 522. A second thermal treatment is then performed in an external magnetic field with a direction indicated by reference number 520. The value of the field used during the second thermal treatment is the optimal value to use the spin flop effect to maintain the desired direction 526 of the magnetization in the first ferromagnetic film 504. The portions of the layers with reference numbers 502, 504, and 506 are sometimes referred to as bias tabs. The direction of magnetization in the portions 507 of the free layer 508 which are AP pinned are indicated by reference number 522. The portion 526 of the free layer 508 which is not AP pinned is in the gap region 516. The bias stabilization of this latter portion 526 of the free layer 508 is provided by the regions 507 which are AP pinned.

Figure 6:
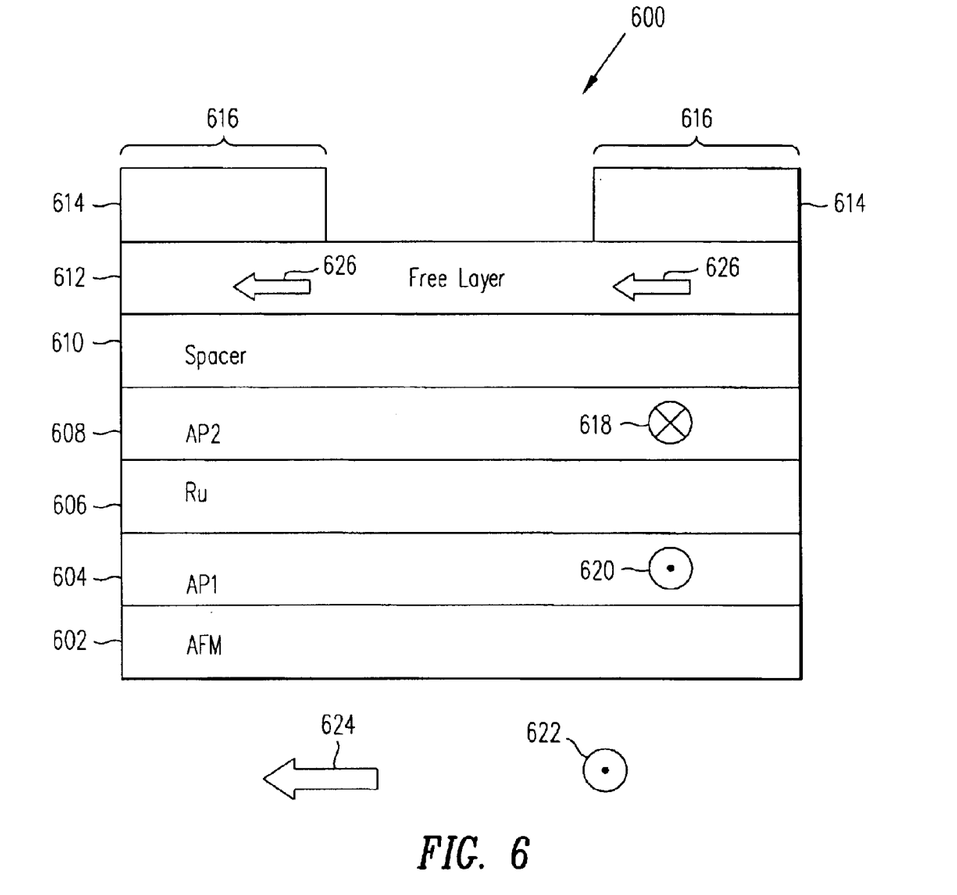
FIG. 6 shows a diagram of an alternative sensor with bias tabs.

A diagram of another sensor 600 which also uses bias tabs is shown in FIG. 6. The first AFM layer 602 is shown next to the first ferromagnetic film 604. The AP substructure is comprised of the first ferromagnetic film 604, the spacer formed from ruthenium 606, and the second ferromagnetic film 608. The spacer 610, typically of copper, separates the second ferromagnetic film 608 from the free layer 612. A second AFM layer 614 is formed over portions 616 of the free layer 616. Using Method I, this sensor 600 is pre-initialized by performing a thermal treatment in a high magnetic field having the orientation shown by reference numeral 622. Then the initialization is carried out in a field of optimal magnitude which has the orientation indicated by reference numeral 624. After initialization, the orientation of the magnetization in the portions 616 of the free layer 612 adjacent to the second AFM layer 614 is indicated by reference numeral 626. Also the orientations of the magnetizations in the first and second ferromagnetic layers 604, 608 after initialization are shown by reference numerals 620 and 618.

Another advantage of utilizing the spin flop effect during initialization is that the use of an external field greater than 2000 Gauss is much more likely to overcome undesirable demagnetization effects. For example, in FIG. 6 there may have been some slight undercutting (not shown) in the free layer 612 during the construction of the bias tabs 614. The slight step or non-uniformity in the free layer would cause a demagnetizing field which is necessary to overcome during the initialization. A magnetic field with the optimal value needed to take advantage of the spin flop effect would be more likely to overcome this unwanted demagnetizing field compared with a weaker applied field.

As will be appreciated by one skilled in the art, the examples of sensors discussed above are representative of many possible sensors which have two separate AFM layers and an AP pinned substructure. The examples show directions of magnetizations which are specific but can be altered and still be within the scope of the invention. For example in FIG. 6 the direction 624 of the initialization field and the direction of the portions 616 of the free layer 612 adjacent to the second AFM layer 614 are shown pointing to the left. Those magnetization directions could easily be pointing to the right if desired. Either orientation would accomplish the goal of substantially removing the initial randomness in the directions of magnetization to achieve a sensor with predictable signal polarity. Other structures may differ in specific materials, geometries, or bias techniques and remain within the scope of the present invention.

One important advantage of using the spin flop effect to initialize the sensor is that the two AFM layers may be of substantially the same material having substantially the same blocking temperature. This advantage is especially useful since the same AFM material is likely to be the optimum choice for both AFM layers. Alternatively the two AFM layers may be of two different materials which have two different blocking temperatures. Furthermore, the pre-initialization and the initialization can be carried out on the finished sensor without having to interrupt the sensor construction or to interrupt vacuum.

In the examples above it was assumed that the sensor construction was completed and then the pre-initialization and initialization was carried out. However, it is also possible to construct a portion of the sensor, perform a pre-initialization, and then complete the construction of the sensor. For example, the sensor in FIG. 4a can be partially constructed by forming the layers 402, 404, 406, and 408. The construction can be interrupted and the partial assembly can be pre-initialized. The remaining layers of the sensor can then be formed. Finally the second thermal treatment can then be performed.

Figure 7:
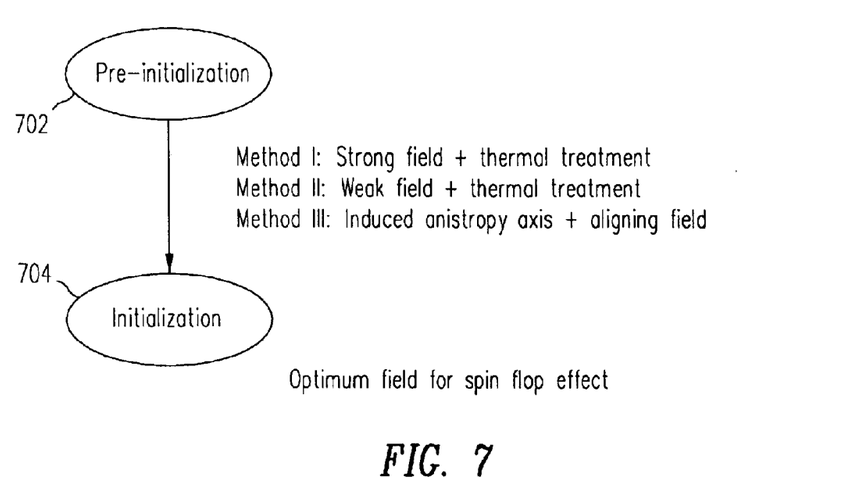
FIG. 7 shows a summary of the method of pre-initialization followed by initialization according to the present invention.

The inventive method is summarized in FIG. 7. A pre-initialization 702 is performed on a sensor having an AP pinned substructure. The pre-initialization 702 significantly reduces randomness in the direction of the magnetization of AP1. The pre-initialization 702 can be performed by using a strong applied magnetic field, a weak magnetic field, or by inducing a uniaxial anisotropy along with a weak aligning field. After pre-initialization 702, an initialization 704 is performed. The field applied during initialization 704 is chosen to maintain the pre-initialized state of the AFM adjacent to the first ferromagnetic film of the AP pinned substructure by utilizing the spin flop effect.

From the foregoing it will be appreciated that the method for initializing the sensor as provided by the present invention is a significant improvement in the art. Sensors can be constructed using the same or different materials for the two AFM layers. Sensors thus constructed and initialized will have predictable signal polarity; can have the same AFM material for both AFM layers; and, be less likely to incur thermal damage during manufacturing.

I claim:

1. A method of initializing a first and a second antiferromagnetic layer in a magnetic sensor, said magnetic sensor having an antiparallel pinned substructure, said antiparallel pinned substructure having a first and a second ferromagnetic film, said first antiferromagnetic layer exchanged coupled to said first ferromagnetic film, said method comprising:

performing a first thermal treatment of said magnetic sensor in a first magnetic field to pre-initialize said first antiferromagnetic layer; and, performing a second thermal treatment of the magnetic sensor in an optimal value magnetic field to initialize said second antiferromagnetic layer, wherein the magnitude and direction of said optimal value magnetic field is chosen to maintain the pre-initialized direction of magnetization in said first ferromagnetic film.

2. A method as in claim 1, wherein the direction of said optimal value magnetic field is approximately 90 degrees relative to the direction of said first magnetic field.

3. A method as in claim 1, wherein said first thermal treatment includes heating from about 1 to 20 hours at a temperature of about 150 to 400 degrees C.

4. A method as in claim 1, wherein said second thermal treatment is performed by heating from about 1 to 20 hours at a temperature of about 150 to 400 degrees C.

5. A method as in claim 1, wherein said first magnetic field is above 4000 Oe.

6. A method as in claim 1, wherein said first magnetic field is below 500 Oe.

7. A method of initializing a first and a second antiferromagnetic layer, each being of substantially the same material as the other, in a magnetic sensor, said magnetic sensor having an antiparallel pinned substructure, said antiparallel pinned substructure having a first and a second ferromagnetic film, said first antiferromagnetic layer exchanged coupled to said first ferromagnetic film, said method comprising:

performing a first thermal treatment of said magnetic sensor in a first magnetic field to pre-initialize said first antiferromagnetic layer; and, performing a second thermal treatment of said magnetic sensor in an optimal value magnetic field to initialize said second antiferromagnetic layer, wherein the magnitude and direction of said optimal value magnetic field is chosen to maintain the pre-initialized direction of magnetization in said first ferromagnetic film.

8. A method as in claim 7, wherein the direction of said optimal value magnetic field is approximately 90 degrees relative to the direction of said first magnetic field.

9. A method as in claim 7, wherein said first thermal treatment is performed by heating from about 1 to 20 hours at a temperature of about 150 to 400 degrees C.

10. A method as in claim 7, wherein said second thermal treatment is performed by heating from about 1 to 20 hours at a temperature of about 150 to 400 degrees C.

11. A method as in claim 7, wherein said first magnetic field is above 4000 Oe.

12. A method as in claim 7, wherein said first magnetic field is below 500 Oersteds.

13. A method of initializing a first and a second antiferromagnetic layer in a magnetic sensor, said sensor having an antiparallel pinned substructure, said antiparallel pinned substructure having a first and a second ferromagnetic film, said first antiferromagnetic layer exchanged coupled to said first ferromagnetic film, said method comprising:

inducing a preferred orientation of magnetization in at least one of said first or second ferromagnetic films in said antiparallel substructure during the deposition of said first and second ferromagnetic films;

placing the sensor in a weak magnetic field;

increasing the magnitude of said magnetic field to the optimal value such that the direction of magnetization in said first ferromagnetic film is approximately 90 degrees relative to said magnetic field; and, performing a thermal treatment in said magnetic field having said optimal value.

14. A method as in claim 13, wherein said thermal treatment is performed by heating from about 1 to 20 hours at a temperature of about 150 to 400 degrees C.

15. A method of initializing a first and a second antiferromagnetic layer, each being of substantially the same material as the other, in a magnetic sensor, said magnetic sensor having an antiparallel pinned substructure, said antiparallel pinned substructure having a first and a second ferromagnetic film, said first antiferromagnetic layer exchanged coupled to said first ferromagnetic film, said method comprising:

inducing a preferred orientation of magnetization in at least one of said first or second ferromagnetic films in the antiparallel substructure during the deposition of said first and second ferromagnetic films;

placing the sensor in a weak magnetic field;

increasing the magnitude of said magnetic field to the optimal value such that the direction of magnetization in said first ferromagnetic film is approximately 90 degrees relative to the magnetic field; and, performing a thermal treatment in said magnetic field having said optimal value.

16. A method as in claim 15, wherein said first thermal treatment is performed by heating from about 1 to 20 hours at a temperature of about 150 to 400 degrees C.

* * * * *